US010257040B1

(12) United States Patent
Prahlad et al.

(10) Patent No.: US 10,257,040 B1
(45) Date of Patent: Apr. 9, 2019

(54) RESOURCE CONFIGURATION HISTORY SERVICE

(71) Applicant: Amazon Technologies, Inc., Seattle, WA (US)

(72) Inventors: Prashant Prahlad, Seattle, WA (US); Rajesh Viswanathan, Mercer Island, WA (US); Adam Daniel Everett Wright, Seattle, WA (US); Benjamin John Ullom, Shoreline, WA (US); Tanya Bansal, Redmond, WA (US); Veeraraghavan Vijayaraj, Bellevue, WA (US); William Trotter Shelton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 381 days.

(21) Appl. No.: 14/657,130

(22) Filed: Mar. 13, 2015

Related U.S. Application Data

(60) Provisional application No. 62/077,904, filed on Nov. 10, 2014.

(51) Int. Cl.
H04L 12/24 (2006.01)

(52) U.S. Cl.
CPC ...... *H04L 41/0859* (2013.01); *H04L 41/0853* (2013.01)

(58) Field of Classification Search
None
See application file for complete search history.

(56) References Cited

U.S. PATENT DOCUMENTS

| 6,823,376 | B1 | 11/2004 | George et al. |
| 7,685,270 | B1 | 3/2010 | Vermeulen et al. |
| 7,729,955 | B2 | 6/2010 | Frederick et al. |
| 7,743,001 | B1 | 6/2010 | Vermeulen et al. |
| 7,792,963 | B2 | 9/2010 | Gould et al. |
| 8,145,726 | B1 | 3/2012 | Roche et al. |
| 8,447,829 | B1 | 5/2013 | Geller et al. |

(Continued)

OTHER PUBLICATIONS

Amazon Simple Notification Service, Developer Guide, API Version, 190 pages, Mar. 31, 2010.

(Continued)

*Primary Examiner* — Sargon N Nano
*Assistant Examiner* — Christopher B Robinson
(74) *Attorney, Agent, or Firm* — Knobbe Martens Olson & Bear, LLP

(57) ABSTRACT

A configuration history service for web-based computing resources is implemented by capturing and storing a historical record of each configuration state for each computing resource in a subscriber's account. Files of the configuration history store information about a computing resource type offered by the web service. The file comprises records for each particular resource of that type that is or was actively configured in the subscriber's account during the period that the configuration history service is active in the account. Each record lists a particular configuration state, at a particular point in time, for a particular computing resource. The configuration history of a computing resource can be displayed as a timeline by which a subscriber can access information describing the configuration state of the particular computing resource at any point in time.

20 Claims, 11 Drawing Sheets

(56) References Cited

U.S. PATENT DOCUMENTS

| | | |
|---|---|---|
| 8,566,832 B1 | 10/2013 | Sakarda |
| 8,606,920 B1 | 12/2013 | Gupta et al. |
| 8,756,322 B1 | 6/2014 | Lynch |
| 8,775,577 B1 | 7/2014 | Alford et al. |
| 8,819,068 B1 | 8/2014 | Knote et al. |
| 8,826,001 B2 | 9/2014 | Betz et al. |
| 9,288,074 B2 | 3/2016 | Stern et al. |
| 2002/0138443 A1 | 9/2002 | Schran et al. |
| 2005/0044220 A1* | 2/2005 | Madhavan ............ G06F 9/5027 709/225 |
| 2005/0240550 A1* | 10/2005 | Armes ............... G06F 17/30067 |
| 2006/0080666 A1 | 4/2006 | Benedetti et al. |
| 2006/0206536 A1 | 9/2006 | Sawdon et al. |
| 2007/0283011 A1 | 12/2007 | Rakowski et al. |
| 2008/0301081 A1* | 12/2008 | Karnik ................ G06F 9/44505 706/48 |
| 2009/0193298 A1* | 7/2009 | Mukherjee .......... G06F 11/0718 714/38.1 |
| 2011/0055134 A1 | 3/2011 | Dvorak et al. |
| 2011/0197094 A1 | 8/2011 | Wagner |
| 2012/0047421 A1* | 2/2012 | Holman ............. G06Q 10/1091 715/202 |
| 2012/0130936 A1* | 5/2012 | Brown .................. G06N 5/048 706/52 |
| 2012/0143821 A1 | 7/2012 | Mallya et al. |
| 2012/0291039 A1* | 11/2012 | Heydon ............. G06Q 10/0637 718/104 |
| 2012/0324092 A1 | 12/2012 | Brown et al. |
| 2013/0007258 A1* | 1/2013 | Stern ................... H04L 12/4641 709/224 |
| 2013/0139152 A1 | 5/2013 | Chang |
| 2013/0219217 A1 | 8/2013 | Seren et al. |
| 2013/0246625 A1 | 9/2013 | Vendrow |
| 2013/0290498 A1 | 10/2013 | Macauley |
| 2014/0047117 A1* | 2/2014 | Jensen-Horne ....... G06F 9/5061 709/226 |
| 2014/0088979 A1 | 3/2014 | Garman et al. |
| 2014/0258479 A1 | 9/2014 | Tenginakai et al. |
| 2014/0282829 A1 | 9/2014 | Dabbiere et al. |
| 2014/0325278 A1 | 10/2014 | Omar |
| 2014/0331225 A1 | 11/2014 | Helander |
| 2014/0331277 A1 | 11/2014 | Frascadore et al. |
| 2015/0127815 A1 | 5/2015 | Billore |
| 2016/0050108 A1 | 2/2016 | Baughman |
| 2016/0218938 A1 | 7/2016 | Gupte et al. |

OTHER PUBLICATIONS

Lloyd, J.W., Declarative Programming in Escher, University of Bristol, Department of Computer Science, 128 pages, Jun. 1995 (Revised Aug. 1995).

U.S. Appl. No. 14/657,026, Resource Configuration Service, filed Mar. 13, 2015.

U.S. Appl. No. 14/657,033, Resource Configuration Compliance Service, filed Mar. 13, 2015.

U.S. Appl. No. 14/657,095, Resource Configuration Testing Service, filed Mar. 13, 2015.

\* cited by examiner

| FIG. 2-1 | FIG. 2-2 |

RESOURCE CONFIGURATION HISTORY SERVICE

PRIORITY CLAIM

This application claims a priority benefit under 35 U.S.C. § 119 to the following U.S. Provisional Patent Application Ser. No. 62/077,904, filed on Nov. 10, 2014, entitled RESOURCE CONFIGURATION SERVICE, which is incorporated by reference in its entirety herein.

RELATED APPLICATIONS

This application is related to similar subject matter of co-pending and commonly-assigned U.S. patent application Ser. No. 14/657,026, entitled "RESOURCE CONFIGURATION SERVICE," filed on Mar. 13, 2015; Ser. No. 14/657,033, entitled "RESOURCE CONFIGURATION COMPLIANCE SERVICE," filed on Mar. 13, 2015, now issued as U.S. Pat. No. 10,057,184; and Ser. No. 14/657,095, entitled "RESOURCE CONFIGURATION TESTING SERVICE," filed on Mar. 13, 2015, which are incorporated by reference in their entirety herein.

BACKGROUND

An increasing number of computing services are being made available over networks such as the Internet, and an increasing number of enterprises (such as businesses, universities, research institutions, governmental departments, and the like) are turning to technologies, such as network-based computing services, also referred to as web services, to meet their computing requirements. In such environments, the hardware and software used to provide access to data and applications are typically scalable to meet the needs of various users at any given time. A subscriber to a web service typically rents, leases, or otherwise pays for access to needed computing resources, and thus does not have to purchase and maintain, on-premises, the computing hardware and software to gain access to these resources.

An advantage to using a network-based computing service is that users can quickly reconfigure their available computing resources in response to the changing demands of the enterprise. Subscribers to network-based computing services receive great flexibility to alter the configuration of their computing environments. Additionally, network-based computing service resources can change automatically and frequently, based on usage, traffic or other operational or business needs of the web service provider. This dynamic nature of network-based computing services, in contrast to a relatively static infrastructure of on-premises computing environments, presents a challenge for web service users to monitor, manage, secure, and control their enterprises' computing environments.

BRIEF DESCRIPTION OF THE DRAWINGS

FIGS. 2, 2-1, and 2-2, collectively, are a resource dependency map illustrating an example of the relationships between computing resource types, in accordance with an embodiment of the disclosed resource configuration service.

DETAILED DESCRIPTION

Figure 1:
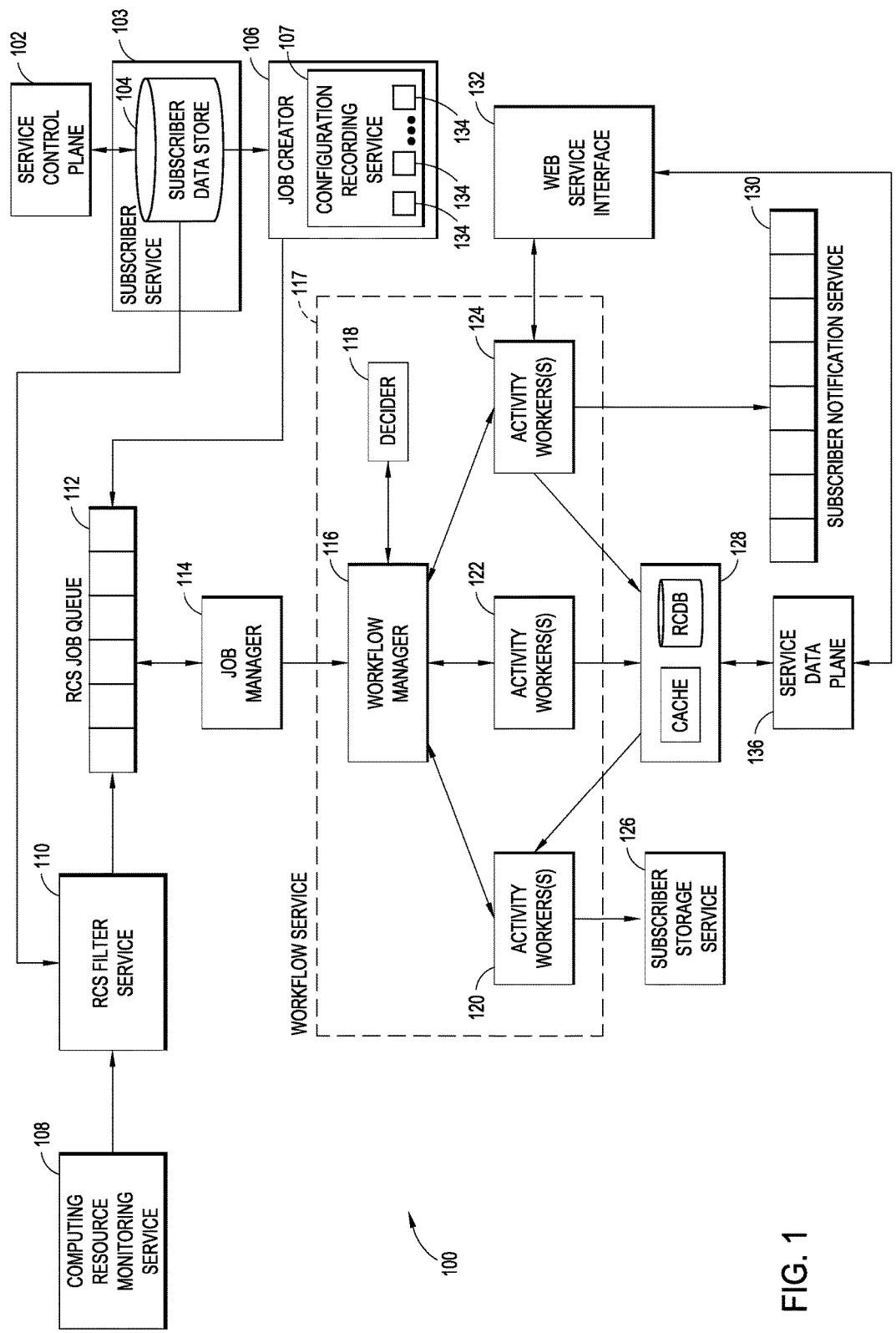
FIG. 1 is a functional block diagram illustrating an example embodiment of a resource configuration service that can monitor changes to computing resources provided by a web service provider.

The present disclosure relates to a resource configuration service. In particular, various embodiments of systems, methods, and computer-readable media to monitor, manage and control configurations of computing resources established on a network-based computing service (also referred to as a web service) are disclosed. In one aspect of the present disclosure, the resource configuration service stores configuration information associated with a particular computing resource in a configuration item. A configuration item represents a point-in-time view of the various attributes of a supported web service computing resource that exists in a subscriber's account. The components of a configuration item can include, without limitation, metadata, attributes, relationships, current configuration, and related events. To avoid confusion, each computing resource is referenced by a unique identifier, such as a resource ID or a name designated by the web service provider.

Another aspect of the present disclosure corresponds to a configuration recording service that records the configuration states of supported resources that exist in a subscriber's account in the form of configuration items. Upon activation, the configuration recording service discovers supported computing resources that exist in the subscriber's account and generates a configuration item for each discovered computing resource. Subsequent changes to the configuration states of computing resources (such as creation, modification, or deletion of a computing resource) within a subscriber's account are also recorded, as configuration items, by the configuration recording service. Thus the configuration recording service maintains a complete record of the configuration states of the computing resources in a subscriber's account. The resource configuration service can generate configuration items for computing resources on request, and it also maintains historical records of the configuration items of computing resources from the time the configuration recording service was activated. When the configuration to a computing resource is changed, the resource configuration service captures the configuration details of the changed computing resource as well as the configuration details of related computing resources. The configuration recording service can be stopped and restarted at any time. In some embodiments, the configuration recording service starts automatically when the subscriber subscribes to the resource configuration service.

In another aspect of the present disclosure, the resource configuration service discovers computing resources allocated or associated with subscriber accounts and creates a map, or other type of representational construct, of relationships between those computing resources. Illustratively, by way of non-limiting example, a relationship might include information identifying a network-based storage volume attached to a network-based computing instance that is associated with a security group. The resource configuration service represents relationships between computing resources which facilitates an assessment of how changes to one computing resource may impact other computing resources within a subscriber's account.

In yet another aspect of the present disclosure, the resource configuration service captures a snapshot of one or more subscriber account configurations. A configuration snapshot is a collection of the configuration items for all supported computing resources that existed in a particular subscriber's account at a specified point-in-time. The configuration snapshot is a selection of subscriber computing resources and their corresponding configurations, captured as configuration items. In some embodiments, the configuration snapshot can be utilized to validate one or more portions of a subscriber's configuration. For example, a configuration snapshot can be monitored by system administrators regularly to identify resources that are potentially misconfigured or under-utilized. A configuration snapshot can be made available in multiple formats to support use by other configuration management tools or facilities. Subscribers can have the configuration snapshot stored or maintained to a specified network-based storage service. Additionally, a subscriber can access the snapshot information from, for example, a system console. The subscriber can select a point-in-time and navigate through the snapshot of configuration items using, for example, the identified relationships between the resources.

In another aspect of the present disclosure, the resource configuration service can deliver a configuration stream of notifications, sent to the subscriber's account, providing notice of changes to configurations of computing resources close to the time that those configuration changes are generated. For example, the resource configuration service can create a configuration item each time various events associated with changes to computing resources occur, such as the creation of a computing resource, the modification of a computing resource, the deletion of a computing resources, or various combinations thereof. The generated configuration items can then be added to the configuration stream. The configuration stream provides a continuous feed of all configuration items being created or modified by using, for example, a simple notification service topic that is selected by the subscriber. The configuration stream is helpful for observing configuration changes as they occur (so that the subscriber can analyze the change for potential issues), generating notifications when certain resources are changed, or updating external systems (such as configuration management data bases), that are configured to reflect the current configuration state of the subscriber's computing resources, which may include on-premises computing resources as well as those provided by a web service.

The resource configuration service also includes a configuration history service which is a collection of the configuration items for resources of each resource type over any time period. A configuration history provides a complete history of a computing resource within a subscriber account. The configuration history is also available to the subscriber in multiple formats. The resource configuration service automatically delivers the configuration history for every resource in a subscriber's account to a subscriber storage service. The configuration history includes a set of files, delivered periodically. Illustratively, by way of non-limiting example, in one embodiment the set of files created by a configuration history service are delivered once every six hours. In an embodiment, each file represents a particular resource type and lists the configuration states for all resources of that type that were changed during the period. A subscriber can access the information contained in the subscriber's configuration history by, for example, a system console. The subscriber can select a given resource and navigate to all previous configuration items for that resource using a timeline display. Additionally, the subscriber can access the historical configuration items for a resource from an application program interface, among other forms of user access.

In another aspect of the present disclosure, the resource configuration service identifies dependencies between computing resources used within a subscriber's account. The disclosed resource configuration service captures relationships between the complement of resource types offered by the web service. Included with the set of resource-specific data is a listing of related resources within the same account. The provided dependency information can help subscribers determine how a configuration change to one resource can affect dependent resources within the subscriber's computing environment. Illustratively, the resource configuration service maintains data associated with a relational map, or data structure, of dependency relationships between the various types of computing resources that are available from the web service. In some embodiments, the resource configuration service may publish the map of dependency relationships or distribute the data related to the map to one or more clients. Illustratively, the dependency relationships can help administrators gain insight and perspective into the potential impacts of reconfiguring a particular resource.

The disclosed resource configuration service also provides information to support evaluation of the impact of changes to computing resource configurations based on captured and retained historical records. With access to a state-by-state historical record of the computing environment's configurations, as well as to the dependency relationships between web service computing resources, system administrators can understand how different resources are related, how those relationships changed, and how configuration changes may have affected related computing resources.

In another aspect of the disclosed resource configuration service a graphical display, in the form of a timeline, is provided. The timeline is associated with the event notifications, historical record, or updates provided by the resource configuration service. The timeline may be included as part of a graphical user interface made available, for example, through a system console or made accessible via an application program interface. The graphical user interface provides a visual mechanism to analyze, step-bystep, the historical configuration record of each resource in a subscriber's account. The timeline data readily supports state transition analysis efforts, frequently performed by information technology (IT) professionals to identify the root cause of computing system malfunctions, degradations, security exposures, or policy compliance violations, to name a few.

The resource configuration service also supports prospective analysis of proposed configuration changes to computing resources. In an embodiment, proposed configuration changes may be received by the resource configuration service for testing. For example, the resource configuration service may use the proposed configuration changes in a test environment to determine the effect of the configuration changes and to determine the dependency effects of the proposed configuration changes. As one example, the test environment may comprise one or more test nodes, the one or more test nodes having been constructed by, for example, replaying the configuration histories of one or more operational nodes within an enterprise's computing environment.

In an embodiment, one or more of the mapping of dependency relationships, the configuration histories, and the information received from a client request may be used to determine the effect of changes to policies or configurations on historical resource configurations. For example, a subscriber may be interested in performing a retrospective analysis to determine the effect a policy change would have had on a previous configuration state of an enterprise's computing environment. In such an example, the historical version of the computing environment's configuration may be provided to the configuration testing environment. Based on the historical version, the subscriber can instantiate one or more test nodes with the historical version of the computing environment's configuration by, for example, replaying the configurations up to the point of the historical version, or by actively configuring the computing resources of the test node(s) to reflect the desired version of the configuration history. The policy (or configuration, or any other changes) may be applied to the test node(s), and dependencies may be determined.

In another aspect of the present disclosure, a subscriber may be able to roll back to previous configuration states by selection of a version of the configuration history. The action of reverting a resource or computing environment to a known-good or known-secure configuration state can be partially or fully automated by, for example, integrating the event notification service of the disclosed resource configuration service with, for example, a configuration management system or a compliance enforcement system. Based on specified events, discoverable through the presently disclosed resource configuration service, predefined actions can be implemented close to the time that a compromising or unpermitted event occurs.

Various aspects of the disclosure will now be described with regard to certain examples and embodiments, which are intended to illustrate, but not to limit the disclosure. Nothing in this disclosure is intended to imply that any particular feature or characteristic of the disclosed embodiments is essential. The scope of protection is defined in the claims.

FIG. 1 is a functional block diagram illustrating an example of a resource configuration service (RCS) 100 that can monitor changes in the configuration of computing resources made available by a provider of network-based computing resources, referred to hereinafter as a web service. The RCS 100 has a service control plane 102 through which a user can access the RCS 100 to subscribe, manage, and access the RCS 100. There are several ways by which a user can gain access to the RCS 100. One option to access the RCS 100, without limitation, is by way of a web service management console that provides access to the RCS 100 through a simple, intuitive web-based interface. Typically a management console serves as a single destination for managing web service account resources by way of a graphical user interface. In some embodiments the management console can be implemented in a mobile application to provide users access to the console remotely. Another option by which a user can access the RCS 100 is by way of a command line interface (CLI). A CLI is a unified tool to manage resources and services provided by a web service. Once downloaded and configured by the user, the CLI permits the user to manage and control computing resources and services and to automate certain actions through scripts. Command line interfaces are often preferred by more advanced computer users, such as information technology (IT) system administrators, as they provide a more concise and powerful means to access, manage and control computing resources.

Another option by which a user can access the RCS 100 is by way of a software development kit (SDK) that allows users to build applications that interface directly with infrastructure services offered by the web service provider, such as the RCS 100. Illustratively, a user can choose to integrate the services and information provided by the RCS 100 with, for example, a configuration management data base (CMDB) system and use access features of the SDK to request collection of resource configuration data, import the collected data into the CMDB, and take specific actions under predetermined conditions or circumstances.

The RCS 100 includes a subscription service 103 that includes a subscriber data store 104. To subscribe to the RCS 100 the user identifies or creates a subscriber delivery channel to which resource configuration event notifications will be directed via a subscriber notification service 130. In an embodiment, the notification address can be associated with the subscriber's account, or it can be associated with a different account so long as the different account has policies that grant access permission to the RCS 100. The subscriber also identifies or creates a subscriber storage service 126 to which resource configuration information is directed and stored. In an embodiment, the subscriber storage service 126 can be associated with the subscriber's account, or it can be associated with a different account so long as the different account has policies that grant access permission to the RCS 100.

In an embodiment, the subscription service 103 includes an identity management service (not shown) that permits the subscriber to create an identity access management role and attach policies to that role. The identity management service enables users to securely control access to the RCS 100 by permitting the subscriber to create and manage users and groups of users, and implement permissions to allow and deny access to the RCS 100. Once the identity access management role is created, policies are created and associated with that role. Illustratively, a role can be defined to grant permission to access the subscriber storage service 126 which stores resource configuration information, to access the subscriber delivery channel which provides configuration change event notifications provided by the subscriber notification service 130, and/or to access a configuration recorder 134 which, among other things, controls the specific commands of the RCS 100 that describe and retrieve current and previous states of the account's computing resource configurations. In an embodiment, separate permissions can be defined for access to each of the subscriber storage service 126, the subscriber's delivery channel of the subscriber notification service 130, and the configuration recorder 134, for a particular account.

The subscriber data store 104 stores subscriber information to maintain an up-to-date listing of the web service subscribers that currently subscribe to the RCS 100. The subscriber data store 104 also maintains each subscriber's particular definitions of subscriber storage service 126, subscriber delivery channel 130, identity access management role, configuration recorder 134 and other information associated with subscription to the RCS 100. Illustratively, the subscriber data store 104 can serve as the source of information that governs the services to be provided by the RCS 100 for each subscriber's account. For example, as described above, subscribers to the RCS 100 can choose to stop automatic periodic recording of the account's resource configuration because, e.g., the subscriber's computing environment has reached a relatively stable and static configuration of resources, as reflected by few or no resource configuration changes recorded between multiple sequential periodic recordings of the enterprise's configuration history. The subscriber data store 104 would reflect this election.

The job creator 106 defines and creates jobs to be carried out by the RCS 100 based on, for example, subscriber information provided by the subscriber store 104 and by direct subscriber requests from the service control plane 102. Jobs created by the job creator 106 can include scheduled jobs that are automatically executed, for example, on a periodic basis, such as configuration recording jobs. Jobs created by the job creator 106 can also be automated jobs that are triggered by the occurrence of an event, such as, for example, rolling back a resource configuration to a previous state that complies with security, policy, regulatory or other rules that must be enforced in the subscriber's computing environment. The job creator 106 can also create jobs in response to subscriber requests which may be received directly or indirectly from the service control plane 102. Illustratively, a subscriber can request the RCS 100 to take a snapshot of the present configuration state of the account's computing environment. In response to such a request, a job would be created by the job creator 106 and placed in the RCS job queue 112 for execution. In an embodiment, updates to subscriber information are pushed to the job creator 106 as such updates occur to ensure that automated or scheduled jobs are properly configured to execute according the subscriber's up-to-date preferences.

Included in the job creator 106 is a configuration recording service 107 that creates, manages and controls subscriber configuration recorders 134. As described above, a configuration recorder 134 records the configurations of the supported resources that exist in a subscriber's account in the form of configuration items. A configuration item represents a point-in-time view of the various attributes of a supported computing resource that exists in the subscriber's account. Illustratively, the components of a configuration item can include, for example, metadata, attributes, relationships, current configuration, and related events. In an embodiment, a configuration item also includes information about the contents of a computing resource. For example, the configuration item for a subscriber's instance may contain information about the operating system, user software, and various other parameters. A configuration item relationship may also include network flow, or data flow dependencies. In an embodiment, configuration items can be customized to represent a subscriber's application architecture. In an embodiment a configuration recorder 134 is created by the subscriber before the automated periodic recording can start.

A subscriber can stop and then restart the configuration recorder 134 at any time, as required. In an embodiment, the RCS 100 automatically creates and starts a configuration recorder 134 when the user first subscribes to the resource configuration service 100.

A computing resource monitoring service 108 continuously monitors activity of the computing resources provided by the web service. In an embodiment, the computing resource monitoring service 108 monitors and records all API calls, or access interactions, to a subscriber's account. Illustratively, for each call, the computing resource monitoring service 108 creates a log file that records the identity of the API caller, the time of the API call, the source IP address of the API caller, the request parameters, and the response elements returned by the web service. In an embodiment, the configuration change monitoring service 108 records API calls to a subscriber's account that originate from a web service management console, a web service software development kit (SDK), command line tools, and higher-level web service features or applications, among other sources. The computing resource monitoring service 108 therefore provides to the RCS 100 notification of nearly all events that can cause a configuration change to a computing resource within the web service platform.

An RCS filter service 110, using up-to-date subscriber information provided by the subscriber data store 104, filters the log files provided by the computing resource monitoring service 108 to identify computing resource configuration changes made in the accounts of subscribers to the RCS 100. Acts of resource creation, modification or deletion will be captured by the RCS filter service 110. When a configuration change is made to a resource allocated to a subscriber's account, the RCS filter service 110 submits a notified job to the RCS job queue 112. In an embodiment, the RCS filter service 110 is implemented on multiple servers to handle high-volume inflow from the computing resource monitoring service 108.

The RCS job queue 112 submits jobs to a job manager 114 that prioritizes and schedules jobs in the RCS job queue 112, and submits the jobs to a workflow manager 116. The workflow manager 116 differentiates between, and manages the execution of, decision tasks and activity tasks. Decision tasks are routed to a decider 118 that is configured with, for example, logic, look-up tables, or other decision-making rules or instructions to make and deliver decisions back to the workflow manager 116. For example, a decision task might be a task to decide whether there was an intervening configuration change to a particular computing resource, subsequent to the reported configuration change. Activity tasks are assigned to activity workers 120, 122, and 124 that perform activities, such as, for example, writing a snapshot of the configuration of a particular resource into the subscriber storage service 126. In an embodiment, the number of activity workers 120, 122 and 124 fluctuates in response to the activity task workload. In some embodiments, the workflow, the workflow manager 116, the decider 118, and the activity workers 120, 122, and 124 can be considered to be logically grouped such that the respective discrete functions and structures for each component can be considered as a single workflow service 117.

The subscriber storage service 126 stores resource configuration information that is collected by the RCS 100. The subscriber storage service 126 can be a resource included in the subscriber's web service account, or it can be a resource associated with a different web service account, so long as appropriate access permissions are established. The subscriber storage service 126 comprises a scalable object storage service that can readily expand in capacity to accommodate a steady increasing volume of configuration records. In an embodiment, the subscriber storage service 126 can be external to the web service environment. For example, the subscriber may choose to house the subscriber storage service 126 on-premises or with a different provider of network-based computing resources. Although depicted in FIG. 1 as a single functional element, the subscriber storage service 126 may be partitioned or otherwise allocated into multiple physical, functional, or logical elements that may be, for example, designated to store different subscribers' configuration information.

Information stored in the subscriber storage service 126 can include, without limitation, resource profiles, configuration items, configuration history, and configuration snapshots. Illustratively, a configuration history is a collection of the configuration items for computing resources of each resource type over a time period. The configuration history provides a complete record of the configuration states of each computing resource in a subscriber's account. The configuration history can be used to determine when a computing resource was first created, how the resource has been configured over time periods, and what configuration changes were introduced to the resource at a specific time. The configuration history can also be presented in multiple formats, including a timeline.

A resource configuration data store and cache 128 serves to store captured configuration information at least until the captured configuration information has been stored in the respective subscriber's storage service 126. A cache is included in the resource configuration data store and cache 128 to make frequently-accessed data more readily available to the RCS 100. In an embodiment, the resource configuration data store and cache 128 can also serve as an archive for the RCS 100.

A subscriber notification service 130 is configured to deliver notifications to subscribers' delivery channels every time a change to the subscribers' resource configuration is detected. In an embodiment, the notifications are delivered by a push messaging service. In some embodiments the notifications are delivered by short message service (SMS) text messages, or by electronic mail (e-mail). The subscriber notification service 130 can push messages to mobile devices or distributed services, and it can deliver a notification more than once. In an embodiment the subscriber notification service 130 can be configured to deliver a single notification to multiple delivery channels. In an embodiment, the subscriber notification service 130 defines a topic, which is an access point that allows recipients to dynamically receive identical copies of the same notification. Thus one topic can support deliveries to multiple endpoint types. Illustratively, for example, a topic can group together enterprise IT system administration consoles as well as mobile devices that are issued to enterprise IT system administration personnel. Once the notification is published to the topic, the subscriber notification service 130 delivers appropriately formatted versions of the notification to each recipient.

A web service interface 132 enables information to flow from the RCS 100 to other services or functions of the web service. Illustratively, system-level commands can be issued from the RCS 100 to the web service by way of the web service interface 132. For example, a system-level command can be used to retrieve configuration information describing a current configuration state of a computing resource. A service data plane 136 provides subscriber access to the data stored in the resource configuration data store and cache 128 and transmits the data to the subscriber by the web service interface 132.

Attention is now directed to the types of computing resources offered by a web service provider, and the relationships between those types of computing resources. The RCS 100 defines and publishes a listing of dependencies between the various types of computing resources offered by the web service. In an embodiment, the listing of dependencies can take the form of a map. In some embodiments the listing of dependencies is static, only updated when new web service resource types are added to the web service platform. In some embodiments, the dependency listing is dynamic, enabling subscribers to the RCS 100 to add resource types and to modify dependencies to suit their particular computing resource profiles. According to an embodiment, specific types of computing services (not illustrated) are offered by a web service provider. For each type of computing service, a set of computing resources is associated with the service to realize it. Described below are examples of computing services and the set of computing resources used to realize those computing services. Illustrated in FIGS. 2, 2-1 and 2-2, collectively, is a computing resource dependency map 200 illustrating an example of the relationships between computing resource types, in accordance with an embodiment of the RCS 100.

A network-based computing service provides a resizable computing capacity. Computing resources associated with the network-based computing service include, a customer gateway 202, an elastic IP address 204 (which is a static IP address designated for dynamic, network-based computing), an instance 206 (which is a virtual server), an internet gateway 208, a network access control list 210, a network interface 212, a route table 214, a security group 216, a subnet 218, a virtual private cloud (VPC) 220, a hardware-based virtual private network connection (VPN) 222, and a virtual private network (VPN) gateway 224.

An automatic scaling service helps a user maintain application availability and allows the user to scale web service computing capacity up or down automatically, according to user-defined conditions. Computing resources associated with the automatic scaling service include an auto scaling group 226, a launch configuration 228, and a scaling policy 230.

A persistent, block level storage service is configured to be used with server instances. Computing resources associated with the persistent, block level storage service include a volume 232 and a snapshot 234.

A network-based storage service provides secure, scalable object storage. A computing resource associated with the network-based storage service is a bucket 236.

A relational database service provides resizable relational database capacity. Computing resources associated with the relational database service include a database instance 238, a database parameter group 240, a database security group 242, and a database subnet group 244.

An identity and access management service provides secure access control to a configuration of resources provided by the web service. Computing resources associated with the identity and access management service include a group 246, an instance profile 248, a role 250, and a user 252.

A formation and provisioning service provides a facility to create and manage a collection of related web service resources. A computing resource associated with the formation and provisioning service is a formation stack 254.

A load balancing service distributes incoming application traffic across multiple web service instances to achieve greater levels of fault tolerance in applications. A computing resource associated with the load balancing service is an elastic load balancer 256.

An API call monitoring service monitors and records API calls to a subscriber's account and, for each call, delivers a log file with relevant information. A computing resource associated with the API call monitoring service is a trail 260.

Figures 1, 2:
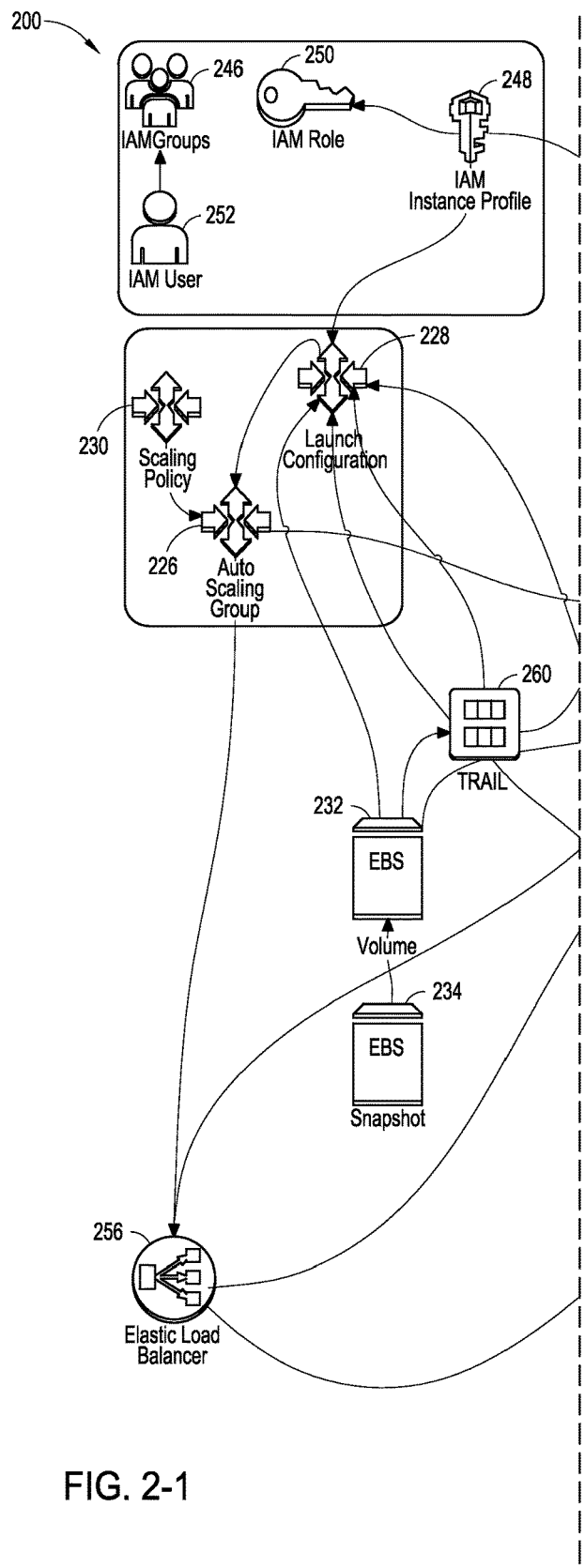
Figure 2:
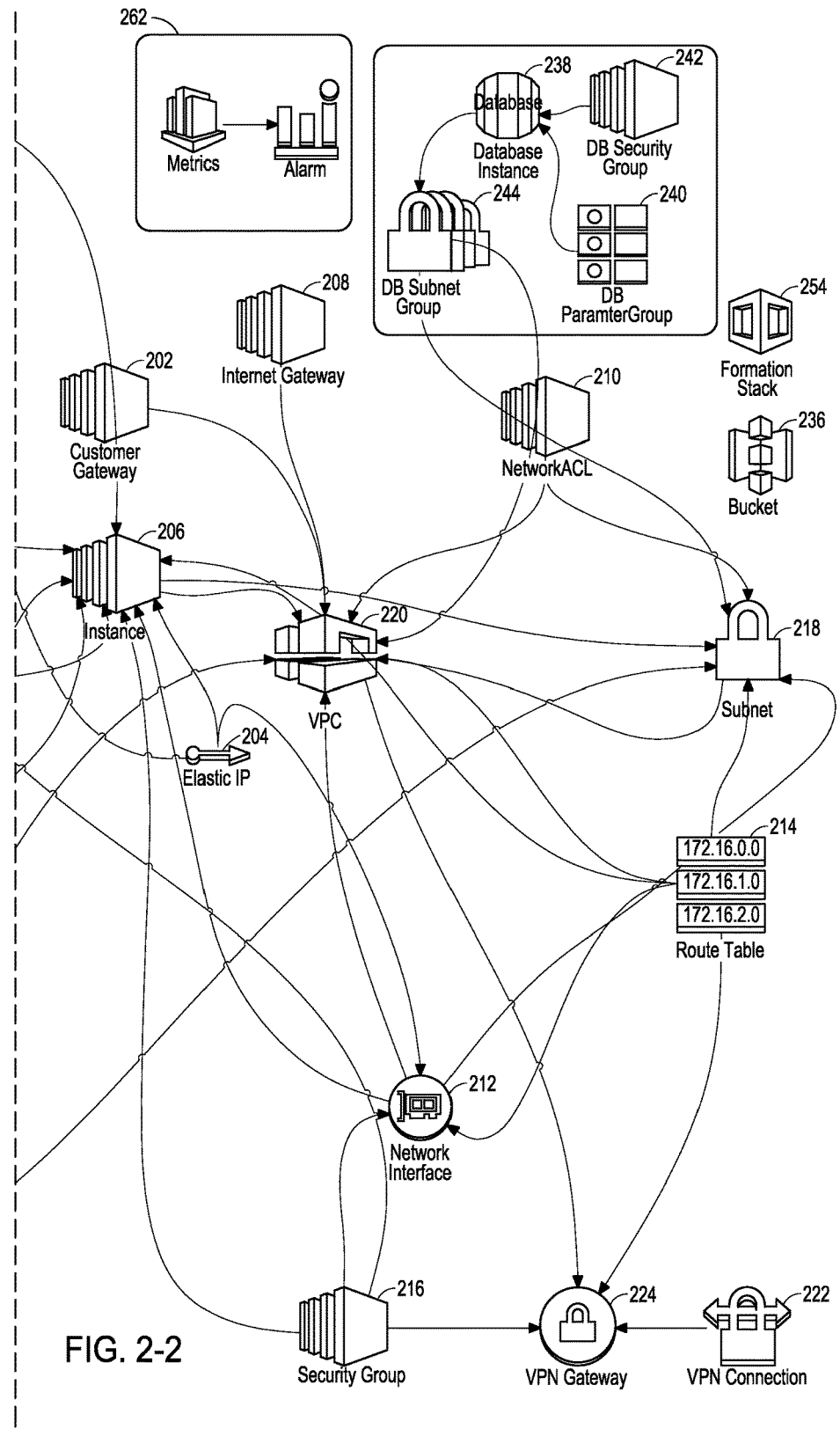

The complexity of the dependency lines in FIGS. 2, 2-1 and 2-2 illustrates the value of defining and documenting the relationships between computing resources to help subscribers to the RCS 100 understand potential impacts of resource configuration changes to a computing environment. For example, as illustrated in FIGS. 2, 2-1 and 2-2, the server instance 206 is a resource that has dependency relationships with eleven other computing resource types in the depicted embodiment. Accordingly, configuration changes to a single server instance 206 could have far reaching impact on a subscriber's IT infrastructure. Without a dependency map, those impacts are typically not easily discovered and often depend on the tribal knowledge of personnel to successfully troubleshoot and resolve reconfiguration-related issues. The effort expended to troubleshoot such issues can be costly and inefficient.

In an embodiment, the dependency relationships defined and documented by the RCS 100 also include qualitative descriptions of the dependency identified. Illustratively, the quality descriptions include whether the computing resource contains, is contained in, is associated with, or is attached to another computing resource. Thus the RCS 100 provides insight to the subscriber as to the existence and qualitative nature of dependency relationships between computing resources configured within the subscriber's computing environment.

Moreover, the map of FIGS. 2, 2-1 and 2-2 reflects merely the different computing resource types that are made available to customers in the web service of the illustrated embodiment. Enterprises typically employ multiple instances of many, if not all, of the offered resource types to meet their IT infrastructure demands. It is not uncommon for large enterprises to employ hundreds, or thousands of such computing resources to provide the necessary computing infrastructure to meet the organization's business needs. Thus even moderately-sized IT infrastructures can achieve levels of complexity and interdependency far greater than that reflected in FIGS. 2, 2-1 and 2-2. Accordingly, the dependency relationship information provided by the RCS 100 can help subscribers analyze and isolate issues in an informed, efficient, and structured manner.

Figure 3:
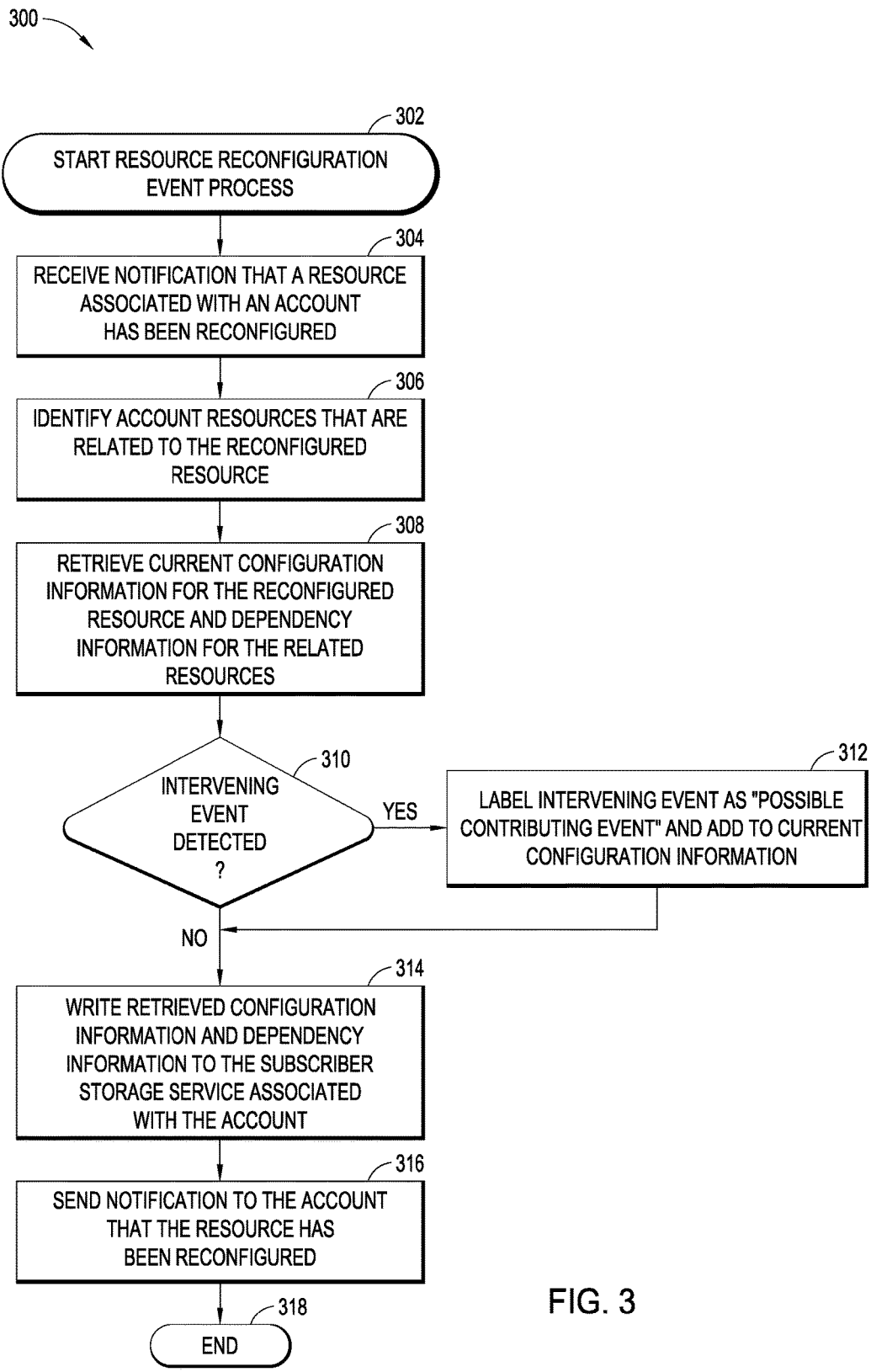
FIG. 3 is a flow diagram of a resource reconfiguration event process, implemented by a resource configuration service, in accordance with an embodiment of the disclosed resource configuration service.

FIG. 3 is a flow diagram of a resource reconfiguration event process 300 implemented by the RCS 100, in accordance with an embodiment of the present disclosure. The resource configuration service 100 can deliver a configuration stream of notifications, sent to the subscriber's account, providing notice of changes to configurations of computing resources as those configuration changes are generated. For example, the resource configuration service can create a configuration item each time various events associated with changes to computing resources occur. Examples of such events include the creation of a computing resource, the modification of a computing resource, the deletion of a computing resource, or various combinations thereof. The generated configuration items can then be added to the configuration stream. The configuration stream provides a continuous feed of all configuration items being created or modified by using, for example, a simple notification service topic that is selected by the subscriber. The configuration stream is helpful for observing configuration changes (as they occur so that the subscriber can analyze the change for potential issues), generating notifications if certain resources are changed, or updating external systems (such as configuration management data bases), that are configured to reflect the current configuration state of the subscriber's web service resources.

In an embodiment, the RCS 100 integrates computing environment management programs, applications or services external to the web service that help subscribers monitor, manage and control their computing environments. Such computing environment management services can include, without limitation, enterprise management tools, configuration management data base services, analysis and query engines, consulting tools, or broker tools. Illustratively, the configuration notification stream delivered by the RCS 100 can provide information that can be processed and integrated into the external services. For example, by way of illustration, a configuration management data base (CMDB) service can support adding new resource types and new relationships for computing resources outside of the web service platform. Illustratively, a subscriber's computing environment can include web service resources and on-premises resources. Thus the subscriber can employ, for example, a CMDB service, informed and updated by configuration information provided by the RCS 100, to create a complete picture of the subscriber's entire computing environment. Illustratively, by way of example, the RCS 100 can integrate with an external automated IT ticket creation and change management processing service that can receive and process the configuration notification information provided by the RCS 100. In an embodiment, subscribers can customize the format of the data provided by the configuration notification stream from the RCS 100 to more easily integrate with such external services. In an embodiment the RCS 100 or the external computing environment management services can provide adaptors that re-format the configuration information provided by the RCS 100 to meet the requirements of such external services to facilitate integration.

The process 300 begins at block 302. At block 304, the RCS 100 receives a notification (from the RCS filter service 110) that a resource associated with a subscriber's account has been reconfigured (e.g., created, modified, or deleted). At block 306, other computing resources in the subscriber's account that have a dependency relationship with the reconfigured resource are identified, based on the information stored in the configuration recording service 134 for the subscriber's account. At block 308, the current configuration information for the reconfigured resource is retrieved by executing a system-level command that delivers an up-to-date description of the configuration state of the computing resource. Similarly, dependency information is retrieved for the identified resources that have a dependency relationship with the reconfigured computing resource (related resources). A configuration item is created for the reconfigured resource. In an embodiment, the configuration item includes the following data elements: metadata, which includes, information about the configuration item; attributes, which include information about the computing resource; relationships, which describe how the computing resource is related to other resources in the account; current configuration state, which includes information that describes the present configuration state of the computing resource; and related events, which describe other events detected that are associated with the present reconfiguration event. In an embodiment, the RCS 100 also retrieves the current configuration information for the identified related resources, analyzes the retrieved configuration information, and determines whether any of the related resources were themselves reconfigured as a result of the reconfiguration event. If one or more reconfigurations of the related resources are identified, a separate reconfiguration event notice, for each reconfigured related resource, will be processed in the manner described above with respect to process 300.

In some embodiments, there can be inherent latencies in the RCS 100, as it can operate in a large, complex, dynamic web service. For example, in an embodiment, the resource configuration monitoring service 108 stores multiple events as a batch and delivers the batch to the RCS filter service 110 periodically, such as, by way of non-limiting example, every five minutes. It is possible that by the time the RCS 100 receives a notification of a reconfiguration event, one or more subsequent intervening events could have already changed the underlying configuration state of the reconfigured resource. In such a circumstance, the retrieved configuration information will reflect the current state of the computing resource as reconfigured by the subsequent intervening event. Thus it is possible that not every reconfiguration event that occurs will have a corresponding state captured as a configuration item in the RCS 100. The retrieved description for the reconfigured computing resource identifies, among other things, the time at which the reported reconfiguration event occurred. Accordingly, at block 310, the process 300 analyzes the retrieved configuration information and compares it with the event time of the event notification delivered by the RCS 100. In this manner, process 300 can determine if an intervening reconfiguration occurred during the latency period described above. At block 312, an identified intervening event (if detected) is labeled as a "possible contributing event," and added to the current configuration information.

At block 314, the retrieved information is written to a storage service associated with the subscriber's account, such as the subscriber storage service 126. At block 316, a notification that the computing resource has been reconfigured is sent to the subscriber's account. In an embodiment the notification is transmitted via the subscriber notification service 130. The notification can include the information contained in the configuration item of the reconfigured resource, or alternatively, the notification points (by a link or other such manner) to the configuration information stored in the account's designated subscriber storage service 126. The process terminates at block 318.

Figure 4:
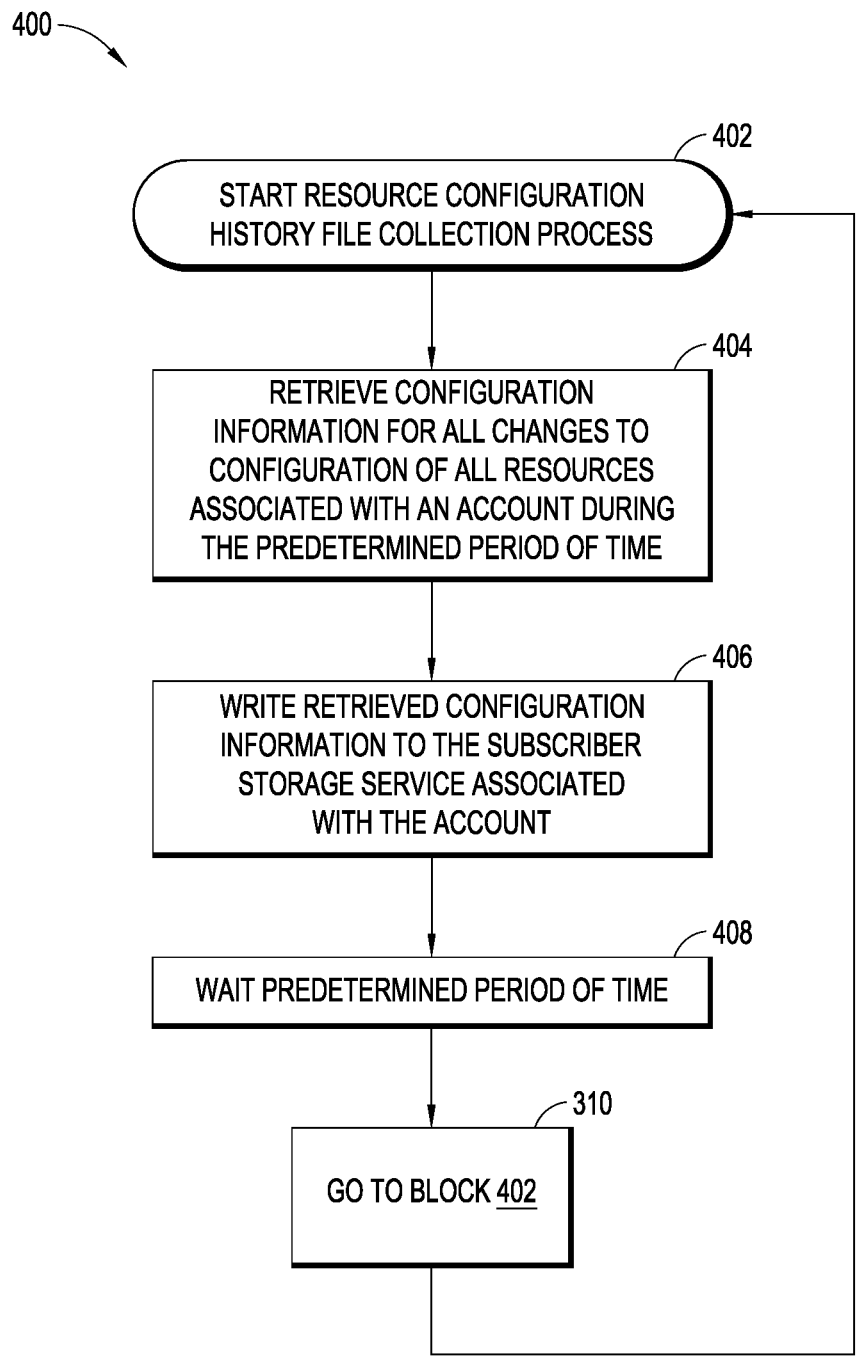
FIG. 4 is a flow diagram of a resource configuration history file collection process, implemented by a resource configuration service, in accordance with an embodiment of the disclosed resource configuration service.

FIG. 4 is a flow diagram of a resource configuration history file collection process 400 implemented by the resource configuration service 100, in accordance with an embodiment of the present disclosure. The configuration history is a collection of the configuration items for resources of each resource type over any time period. A configuration history provides a complete history of a computing resource within a subscriber account. The resource configuration service 100 automatically delivers the configuration history for every resource in a subscriber's account to a subscriber storage service 126. The configuration history includes a set of files, delivered periodically. Each file represents a particular resource type and lists the configuration states for all resources of that type that were changed during the period. A subscriber can access the configuration history by way of, for example a system console, and select a given computing resource to view. Illustratively, the subscriber can navigate to all previous configuration items for that resource, using a timeline display.

At block 402, the process 400 begins, which can occur when the subscriber activates its subscription to the resource configuration service 100 or when the subscriber initiates the configuration history feature. At block 404, information reflecting the current configuration state of all resources associated with the subscriber's account is retrieved from the subscriber's configuration recording service 134. In an embodiment, the retrieved information comprises a configuration item for each resource configured in the subscriber's account. At block 406, the retrieved configuration information is written to the subscriber storage service 126. In an embodiment, the storage locations of the historical configuration information are pre-determined, by resource type, and the configuration information is organized in a single file for each resource type that is or was active in the subscriber's account. In an embodiment, each file includes a list of records configured according to the Java Script Object Notation (JSON) format, which is a lightweight data-interchange format. Each record in the file represents a state of a particular resource, of that resource type, at a particular time. The number of records in each file is therefore: [the number of specific configured resources of that resource type] multiplied by [the number of times each specific configured resource was changed since the last configuration history file collection].

In an embodiment, the configuration information is organized in a single file for each resource that is or was active in the subscriber's account. The file can include multiple records. Each record can represent a configuration state of the resource associated with the file, at a particular time. The number of records in each file is therefore equal to the number of times the resource associated with that file was changed since the last history file collection. In an embodiment, the periodically collected configuration history files can be merged together to create a single configuration history file for each resource that is or was active in the subscriber's account. Thus a configuration history file, comprising multiple records, can reflect the entire configuration history of a particular computing resource. Similarly, a group of configuration history files can reflect the complete configuration history of the entire set of computing resources ever active in a subscriber's account.

At block 408, the process waits a predetermined period of time. In an embodiment, by way of non-limiting illustration, the predetermined period of time is six hours. Once the predetermined period of time has elapsed, the process 400 proceeds to block 410. At block 410, the process 400 returns to block 402, to begin the process 400 over again. In this manner the RCS 100 continually updates the historical configuration record of the subscriber's web service account. The process 400 can terminate when the subscriber elects to stop the configuration history service or when the subscriber terminates its subscription to the resource configuration service 100.

Figure 5:
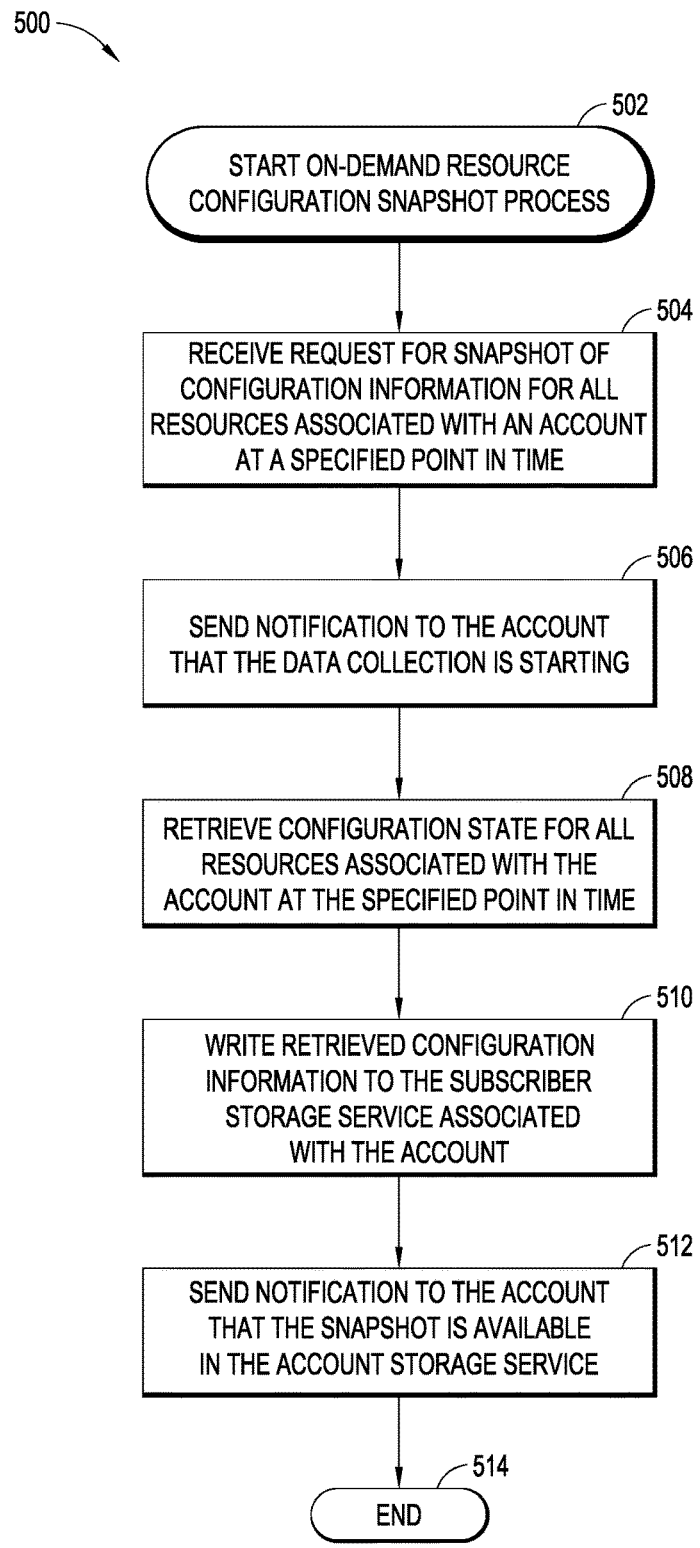
FIG. 5 is a flow diagram of an on-demand resource configuration snapshot process, implemented by a resource configuration service, in accordance with an embodiment of the disclosed resource configuration service.

FIG. 5 is a flow diagram of an on-demand configuration snapshot process 500 implemented by a resource configuration service 100, in accordance with an embodiment of the present disclosure. As discussed above, a configuration snapshot is a collection of the configuration items for all supported resources within a subscriber's account, at a particular point in time. It presents a complete picture of all active computing resources within a subscriber's computing environment at the specified point in time, defining the computing resources' then-present configurations, captured as configuration items.

The process 500 initiates at block 502. At block 504, a request for a snapshot of the configuration information for all of the resources associated with the subscriber's account is received. Illustratively, the subscriber can select the present time as the point in time for which the snapshot request is directed, in which case the RCS 100 will capture the latest-known configuration information of the subscriber's computing environment. The subscriber can also specify a point in time earlier than the present time for which the snapshot is directed, in which case the RCS 100 will access the subscriber account's configuration history to retrieve the requested configuration information. In an embodiment, the RCS 100 delivers an on-demand API that allows a subscriber to request a snapshot of the resource configuration for a specified point in time. In an embodiment, the on-demand API is implemented as a non-blocking call, which places a job in the RCS job queue 112 to deliver one or more files to the subscriber storage service 126. At block 506, a notification that the data collection has begun, in responses to the snapshot request, is sent to the requester's account. At block 508, the configuration states of all of the resources associated with the subscriber's account, at the specified point in time, are retrieved into records and files as describe above with respect to FIGS. 3 and 4. At block 510, the retrieved configuration information is written to the subscriber storage service 126. In an embodiment, the written data is a file that contains the state of all resource types associated with the subscriber's account. The file is written in a JSON format. At block 512, a notification that the requested snapshot data collection is available in the subscriber storage service 126 is sent to the requester's account. In an embodiment, the data is returned directly to the requester. Alternatively, in another embodiment, the notification points to the configuration snapshot information stored in the account's storage service 126. The process 500 terminates at block 514.

Figure 6:
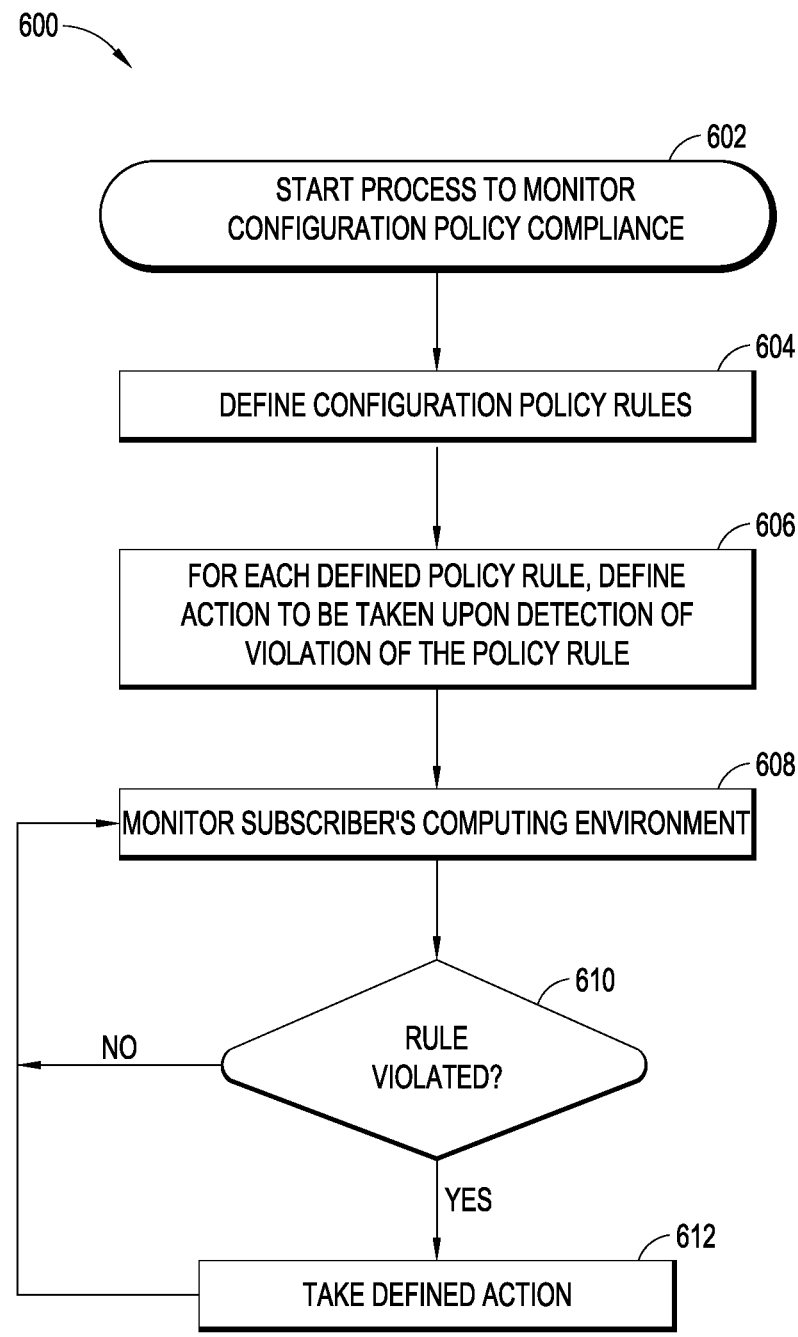
FIG. 6 is a flow diagram of a process to monitor configuration policy compliance, implemented by a resource configuration service, in accordance with an embodiment of the disclosed resource configuration service.

FIG. 6 is a flow diagram of a process 600 to monitor policy compliance, implemented by the resource configuration service 100, in accordance with an embodiment of the present disclosure. The RCS 100 provides a compliance service to help subscribers assert control over their computing resource configurations by allowing them to specify one or more rules governing the configurations of computing resources within the subscriber's account and by monitoring whether those resources conform to the specified configuration rules. At block 602, the process 600 begins. At block 604, the subscriber defines one or more configuration policy rules governing the configuration of computing resources for the subscriber's account. In an embodiment, the compliance service employs a declarative syntax, combined with conditional logic, to define policy rules. A declarative syntax permits the subscriber to describe specific computing resource configuration requirements, including prescriptive and proscriptive requirements. Examples of programming languages that use a declarative syntax include structured query language (SQL) and Prolog. Subscribers use the declarative syntax to define the rules governing the configuration states of the computing resources deployed in their enterprise computing infrastructure. Illustratively, by way of non-limiting example, a subscriber can establish a rule that requires all computing resources within the subscriber's account to be configured to operate within a virtual private cloud.

At block 606, the subscriber defines one or more actions to be taken by the compliance service in the event that a rule is violated. Illustratively, examples of actions that may be taken, without limitation, can include notifying system administrators of the non-compliant configuration, automatically modifying the non-compliant computing resource's configuration to put the resource's configuration in compliance with policy, or deactivating the computing resource. At block 608, the compliance service of the RCS 100 continuously monitors the configuration states of the subscriber's computing resources. In particular, the RCS 100 monitors all configuration changes to computing resources of the subscriber's account, as described above. At block 610, the compliance service evaluates whether a defined configuration policy rule has been violated for every detected change in configuration to a computing resource of the subscriber's account. If no rule is violated, the process 600 returns to block 608 to continue monitoring the subscriber's account. In the event a rule is violated, the process 600 advances to block 612, where a predefined action is taken in response to the violation of the specific configuration policy rule. In an embodiment, a notification communicating that the defined action was taken in response to a detected rule violation can be transmitted to the subscriber's account. Once the predefined action is taken, the process 600 returns to block 608, to continue monitoring the subscriber's account. In an embodiment, the compliance service is configured to operate continuously until the subscriber stops the service. The compliance service can integrate with enterprise configuration management tools to help monitor and control the computing environment. Additionally, the compliance service can summarize overall compliance to configuration policies in, for example, a compliance dashboard display that presents the compliance state of an enterprise configuration at any given point in time.

Figure 7:
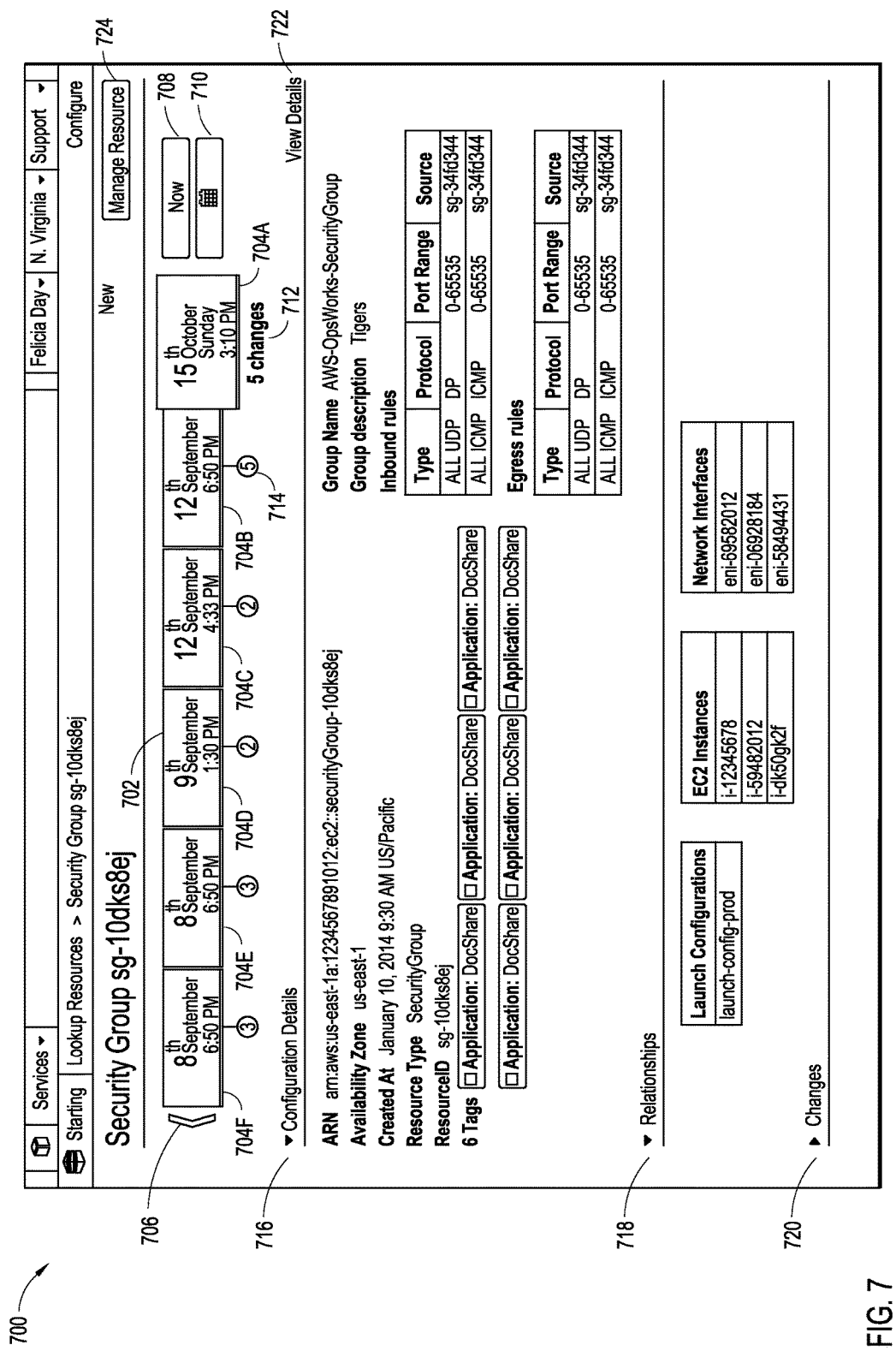
FIG. 7 is an embodiment of a display of historical configuration information for a resource provided by a resource configuration service.

Referring to FIG. 7, the RCS 100 can provide a timeline display associated with the configuration information collected by the service 100, including event notifications, configuration history, or snapshot recordings, among others. In an embodiment, the timeline is included as part of a graphical user interface made available, for example, through a system console or accessible via an application program interface. The graphical user interface provides a visual environment in which a subscriber can analyze, step-by-step, the historical configuration record of each resource in the subscriber's account. The timeline data readily supports state transition analysis efforts to identify the root cause of enterprise malfunctions, degradations, security exposures or compliance failures, as well as other conditions worthy of investigation.

FIG. 7 is an embodiment of a user display 700 presenting historical configuration information for a resource, provided by a resource configuration service 100. The display format can be thought of as a resource configuration timeline, providing detailed views of each configuration state of the selected resource since the customer subscribed to the resource configuration service 100. A subscriber to the RCS 100 can access the display through, for example, a service console or a client library. In FIG. 7, a particular resource, Security Group sg-10dks8ej, is featured in the illustrated display. Near the top of the display is a timeline 702 that identifies various dates and times corresponding to when historical recordings of configuration information for this resource were performed. The various times corresponding to configuration recording times are reflected in timeline blocks 704A-F. Navigation arrows 706 permit the subscriber to navigate backward and forward (the forward navigation arrow is not shown) in time to access any of the recorded historical configuration states of the resource, as reflected in the timeline blocks 704A-F. An enlarged and offset timeline block 704A indicates the presently selected time period. In the example display 700 illustrated in FIG. 7, the timeline block 704A corresponds to the most recent historical configuration recording, as it is farthest to the right of the timeline 702. A "Now" button 708 returns the display to the current configuration of the resource to support easy navigation to the view the present configuration state. A calendar button 710 permits the user to navigate to previous configuration states of the displayed resource by selecting a specific date to which the display 700 can be navigated. A change statement 712, which is directly below timeline block 704A, indicates the number of configuration changes that occurred for the resource before the selected time period and after the time indicated in the previous block 704B. Similarly, a change number 714 indicates the number of configuration changes that occurred for the selected resource between the times indicated in the two adjoining timeline blocks 704A and 704C.

Illustratively, to view the details of the selected configuration item the subscriber uses the navigation arrows 706 to view the time periods when the configuration items for the selected resource were recorded. In the illustrated example of FIG. 7, timeline block 704A has been selected. By selecting the configuration details tab 716, the subscriber can view a description of the selected resource. The relationships tab 718 is where the subscriber can view how the selected resource is related to other resources active in the account. The relationship pane can expand to display tables that display all the related resources. Selecting the changes tab 720 opens up a changes pane that displays the changes to the selected resource that took place during the selected time period. The changes pane can also list relationship changes that occurred due to the recorded resource configuration change. The view details button 722 displays the configuration item information in a text format which appears in a dialog box. A manage resource tab 724 allows the subscriber to make configuration changes to the selected resource.

Figure 8:
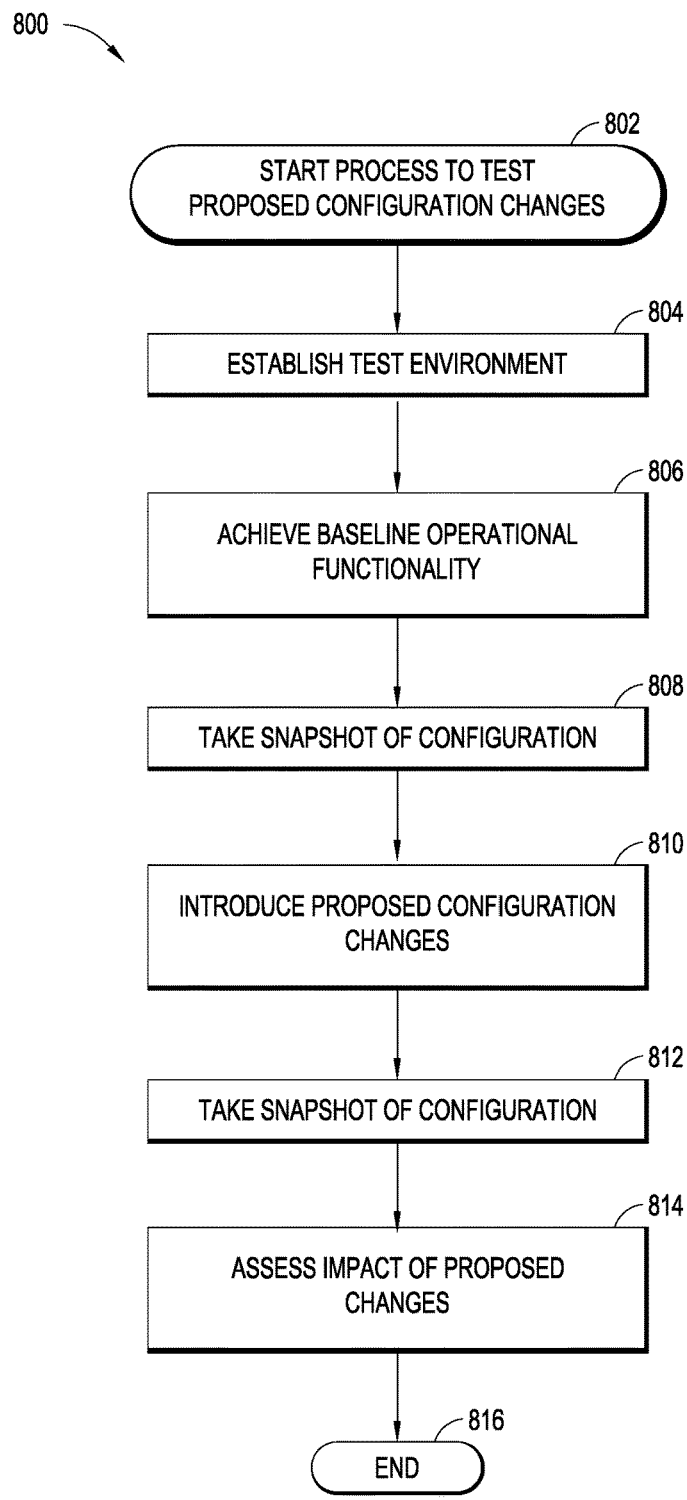
FIG. 8 is a flow diagram of a process to test proposed configurations, implemented by a resource configuration service, in accordance with an embodiment of the disclosed resource configuration service.

FIG. 8 is a flow diagram of a process 800 to test proposed configuration changes, implemented by a resource configuration service, in accordance with an embodiment of the present disclosure. At block 802, the process 800 begins. At block 804, a test environment is established. In one embodiment, the test environment is captive, isolated from the web service provider's operational computing environment. A captive test environment offers a high degree of certainty for the web service provider that experimental configurations will not impact the provider's installed operational user base. However the cost of scaling such a test environment to reflect the behavior and characteristics of the operational environment could be prohibitive. In another embodiment, a test environment can be established within the subscriber's operational computing environment. Precautionary measures can be taken to reduce the potential for harmful impact of the test activities, including, for example, establishing a separate subscriber account or subaccount for the test environment. In an embodiment, the test environment is a portion of the subscriber's operational environment deemed safe to conduct resource configuration excursions.

At block 806, the test environment is configured with computing resources that replicate, simulate, or otherwise represent the operational environment under examination with a degree of fidelity that justifies the experimentation effort. Once configured, the test environment will achieve operational functionality. In an embodiment, simulators are used to load the environment with computing activity reflective of the operational environment under examination. At block 808, a snapshot of the environment's configuration is taken to capture the initial conditions.

At block 810, the proposed resource configuration changes are introduced. The RCS 100 will automatically generate event notifications, providing feedback on the status of the proposed changes, serving to verify that the desired changes were implemented, or to inform the test team that the outcome was different than intended. At block 812, another configuration snapshot is taken to gain an environment-wide perspective of the configuration status. Multiple test scenarios and excursions can be performed sequentially or in parallel during the testing, as all impacted resources and those that are related to the changed resource will be tracked by the RCS 100.

At block 814, the test team analyzes the data provided by the RCS 100 which can include event notifications, multiple configuration snapshots as deemed appropriate, and depending on the duration of the testing effort, one or more historical configuration reports reflecting all changes to all computing resources. In an embodiment, the period for collecting configuration history is adjusted to ensure that historical configuration collections are taken at, for example, the outset and at the conclusion of the testing activities.

Figure 9:
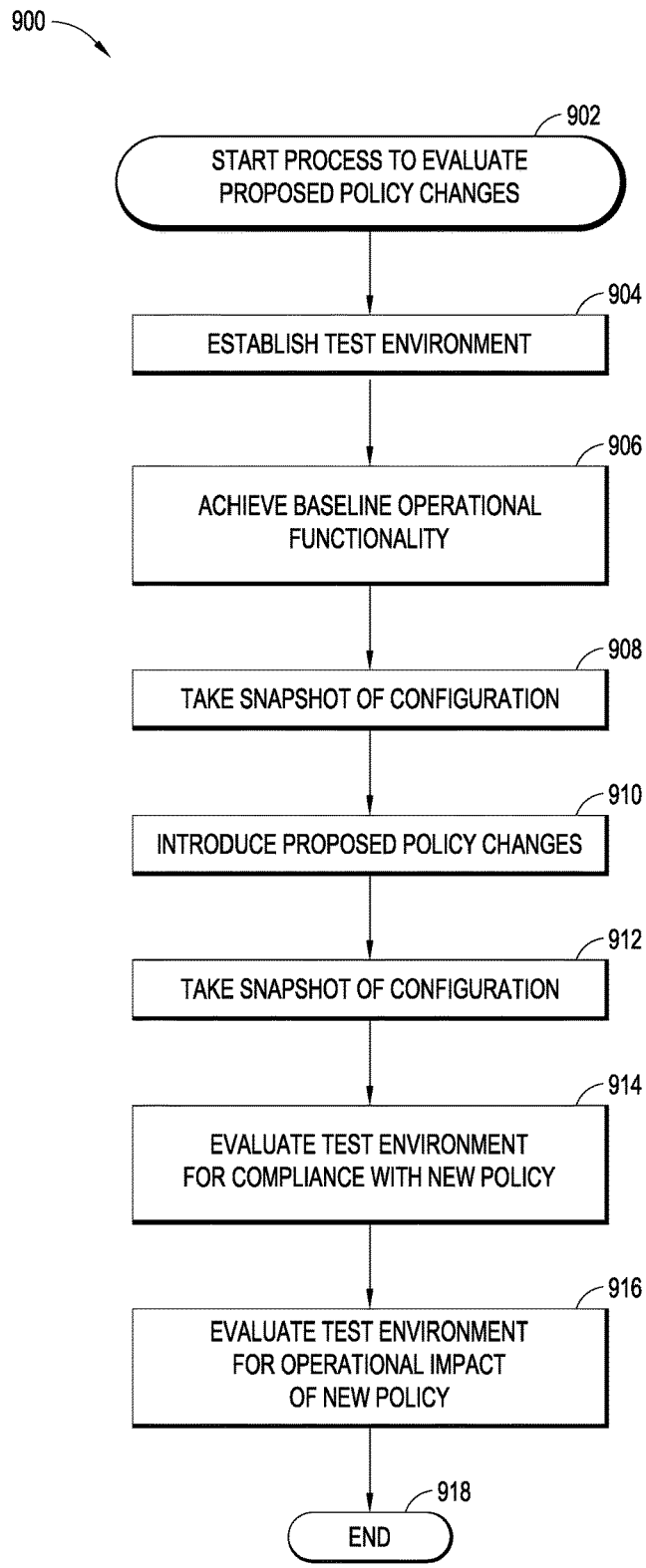
FIG. 9 is a flow diagram of a process to evaluate proposed policy changes, implemented by a resource configuration service, in accordance with an embodiment of the disclosed resource configuration service.

FIG. 9 is a flow diagram of a process 900 to evaluate proposed policy changes, implemented by the resource configuration service 100, in accordance with an embodiment of the present disclosure. At block 902 the process commences. At block 904, a test environment is established. In some embodiments, the operational environment can serve as the test environment because evaluating policy compliance, under some circumstances, can pose an acceptable risk to the enterprise, especially if changes to resource configurations will be limited. Alternatively, if the goal of the evaluation is to gain a retrospective view on how the proposed policy changes would have affected the enterprise computing environment at an earlier configuration state, then it is possible that creation of a captive, isolated or otherwise protected test environment may be appropriate. At block 904, the test environment is configured, as described above with respect to FIG. 8, with computing resources that can adequately represent the computing environment under examination. At block 906, the test environment achieves operational functionality, and at block 908, a snapshot of the test environment's configuration is taken to capture the test environment's initial conditions.

At block 910, proposed policy changes are introduced. In an embodiment, a policy compliance and enforcement system implements the proposed policy changes in an automated manner by comparing relevant characteristics of each computing resource in the test environment against the policy mandates. Illustratively, by way of example, a proposed policy change could be implemented in the test environment to prohibit creation of computing resources outside of a specified virtual private cloud (VPC) 220, or to prohibit modification of the subscriber's primary VPC 220. Based on resource configuration histories, the test team could then recreate specific resource configuration changes actually made during a relevant time period to assess the operational impact to the computing environment such proposed policy changes would have had on the subscriber's computing environment. At block 912, a snapshot of the test environment configuration is taken to serve as a basis for comparison with the initial configuration information. It can be appropriate to take multiple snapshots if the test policy excursions are numerous or if they produce impactful or unexpected results.

At block 914, policy evaluation is performed by evaluating resource configurations and determining whether the captured configurations comply with the proposed revised policy. Depending on the results, additional experimentation can be made on resources that are deemed out of compliance with policy, by for example, reconfiguring the non-compliant resource to a compliant configuration state. At block 916 the policy test team assesses impacts to the test computing environment with respect to factors such a performance, availability, latency, cost, and other metrics used to evaluate the operational condition of a computing infrastructure. The RCS 100 provides change notification and archival information to support real-time and off-line analysis of the influence that policy changes could have had on the computing environment's availability and performance. The process 900 terminates at block 918.

In some embodiments of the present disclosure, there can be resource configuration changes that might not be detected by the RCS 108. For example, the web service can offer spot-priced computing services by which a subscriber bids on excess computing capacity. When the spot price of available computing services is at or below the subscriber's bid price, the computing resources are automatically made available to the subscriber's account. When the spot price exceeds the subscriber's bid price, the computing resources are terminated, automatically. In such circumstances, computing resources, such as instances 206, can originate and terminate within a user's account automatically, without an explicit action, such as an API call, that would be captured by the resource configuration monitoring service 108 and subsequently detected by the RCS filter service 110. Accordingly it is possible that that undetected configuration changes can lead to discrepancies in resource reconfiguration event reports provided by the RCS 100. In an embodiment, to address this issue, the RCS 100 periodically collects descriptions of all configured computing resources in a subscriber's account to support use of an anti-entropy protocol. The anti-entropy protocol is a mechanism designed to identify and reconcile discrepant information by periodically comparing current system configuration descriptions with the configuration information stored in the RCS 100 for a particular subscriber's account. Illustratively, by way of non-limiting example, the periodic collection of resource descriptions is executed every six hours.

Operationally, the disclosed RCS 100 provides data to IT administrators, compliance officers, security administrators, and other professionals to help them perform their functions more effectively. Illustratively, the RCS 100 can help administrators assess the impact of, and respond to, changes to computing resources. In an embodiment, specific actions can be defined to be taken upon the receipt of a reconfiguration event. For example, if a resource configuration change is made that violates a policy or exposes the enterprise to an unacceptable security risk, the subscriber can institute automated procedures to cause the resource to revert back to a previous, compliant configuration, or to shut down the resource until an investigation can be completed.

The RCS 100 can deliver detailed visibility into the specific computing resources being used by the enterprise and how those resources are configured at any given time. The RCS 100 permits computing resource administrators to exercise better governance over enterprise resource configurations, and to detect resource misconfigurations. Illustratively the RCS 100 can automatically notify system administrators whenever resources are created, modified, or deleted thereby eliminating the need to keep track of such changes by polling the calls made to each resource. Moreover, a subscriber might be working with data that requires frequent audits to ensure compliance with internal policies, best practices, industrial standards, or regulatory requirements. To demonstrate compliance, the subscriber requires access to the historical configurations of the resources comprising the enterprise computing environment, thereby creating an audit trail. This information can be provided by the RCS 100.

The RCS 100 also supports effective resource management and troubleshooting. When a computing environment is configured with multiple resources that depend on one another, a change in the configuration of one resource might have unintended and unforeseen consequences on related computing resources. The RCS 100 can provide advance visibility into potential impacts the of proposed configuration changes by providing views of how the resource intended to be modified is related to other resources. Accordingly the RCS 100 supports performance of anticipatory impact analysis rather than reactive remediation. The RCS 100 also supports use of historical computing resource configuration information to troubleshoot issues and to access the last-known good configuration of a misconfigured resource.

Illustratively, the RCS 100 enables users of the subscriber's account to evaluate their computing policies against the current state, or any previous state, of the subscriber's web service infrastructure. Moreover, the historical configuration data will provide evidence to regulators and other policy officials as to whether or not the enterprise has been in compliance. Additionally, the RCS 100 can enable policy makers to evaluate proposed changes to their policies to help determine the often unforeseen consequences of such proposed changes.

The RCS 100 also supports achieving stability in the enterprise computing environment by providing administrators with the data and the perspective to identify and define known-good configurations. This enables creation of restore points for the enterprise. In an embodiment, the RCS 100 can publish and promulgate resource configurations that are known to achieve certain objectives, such as, for example, system performance objectives or system security objectives.

A visual display of enterprise resource utilization relative to configuration status can also be provided by the RCS 100. A heat map is provided to graphically illustrate the configured resources, with colors (such as red, yellow and green) serving to indicate resources that have, for example, demonstrated problems with policy compliance, security compliance, performance degradation, frequent misconfiguration, frequent reconfiguration, or other areas of interest or concern for enterprise system administrators.

In an embodiment, the RCS 100 supports change management workflows. For example, the stream of notifications of reconfiguration events provided by the RCS 100 can serve as timely, automated verification to an IT administrator that a desired configuration change has been made correctly. Additionally, the rich set of configuration-related information provided by the RCS 100 can serve to inform troubleshooting investigations when service tickets or other maintenance or support efforts are initiated and investigated by IT administrative staff.

The RCS 100 can also provide support for security incident analysis. The resource configuration history provides a record of when, and under what conditions, vulnerabilities were exposed. Moreover, the historical archive of configuration data can support a comprehensive retrospective analysis of a security violation.

In an embodiment, RCS 100 is also capable of tracking the configurations of, among other things, operating systems and software applications installed on the computing resources of a subscriber's account. The RCS 100 can enable subscribers to monitor, for example, key-value pairs from a machine's operating system registry. Subscribers can use such information to determine whether a particular operating system update has been applied, or a particular application configuration is maintained.

The RCS 100 is capable of extending its capacity beyond the computing resources of the web service. Extensibility tools enable subscribers to define, represent, and monitor within the RCS 100 their non-web-service computing resources, such as on-premises computing resources or computing resources delivered by other network-based computing providers.

Figure 10:
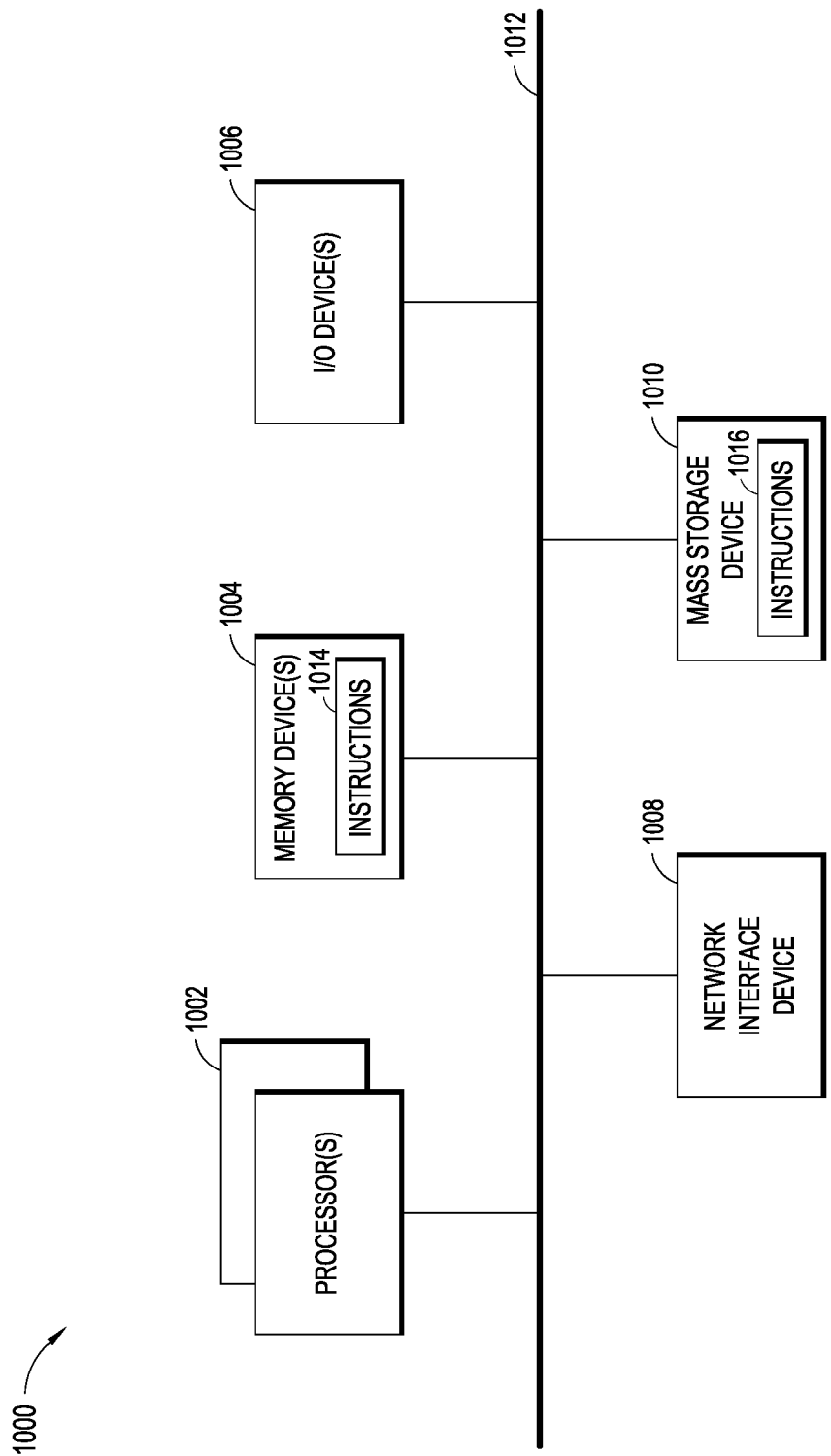
FIG. 10 is a functional block diagram of an example general purpose computing device and system suitable for use in executing the systems, methods and computer-readable media of the disclosed resource configuration system and service.

FIG. 10 is a functional block diagram of an embodiment of a general purpose computing device and system 1000 suitable for use in executing the methods and computer-readable media of the disclosed resource configuration service 100, in accordance with an embodiment. By way of illustration, the computing device 1000 can include, for example, a laptop computer, a stand-alone personal computer, and a server, to name a few. The computing device 1000 can include one or more processors 1002, one or more memory devices 1004, one or more input and output (I/O) devices 1006, one or more network interface devices 1008, and a mass storage device 1010. The one or more processors 1002 can be configured to execute instructions and to process data to perform one or more functions, such as the methods and computer-readable media disclosed herein. The memory 1004 can include one or more memory devices that store data, including without limitation, random access memory (RAM) and read-only memory (ROM). The I/O device(s) 1006 may include one or more components that allow a user of the computing device 1000 to interface with applications executing in the computing device 1000. For example, the I/O device 1006 may include devices such as, for example, a keyboard, a mouse, a touch pad, a touch screen, a microphone, an accelerometer, a camera, or any other user input device configurable to work with the computing device 1000. The I/O device(s) 1006 may also include, for example, a display (e.g., an LCD display, a CRT display, electronic ink, or a plasma display), a printer, a speaker, or any other output devices configurable to work with the computing device 1000. The network interface device 1008 may include any communication device for sending and receiving data across a network, including but not limited to, a network interface card, a modem or another network adapter capable of transmitting and receiving data over a network. The mass storage device 1010 can include, for example, a magnetic storage device (e.g., a hard disk), an optical storage medium (e.g., a CD or DVD drive), a high-definition optical storage medium, an electronic storage device (e.g., EPROM or a flash drive), or other data storage devices known in the art. The components of the computing device 1000 are coupled together by way of a bus 1012, which may represent one or more buses. The memory device 1004 and the mass storage device 1010 may be employed to store a working copy and a permanent copy of programming instructions, illustrated as instructions 1014 and 1016, respectively, for implementing various aspects of the previously described embodiments of the present disclosure.

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS").

Further, the processing of the various components of the illustrated systems can be distributed across multiple machines, networks, and other computing resources. In addition, two or more components of a system can be combined into fewer components. For example, various systems can be distributed across multiple computing systems, or combined into a single computing system. Further, various components of the illustrated systems can be implemented in one or more virtual machines, rather than in dedicated computer hardware systems. Likewise, the data repositories shown can represent physical or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A system for managing configurations of computing resources in a network-based computing environment, the system comprising:
   at least one computing device comprising at least one processor; and
   a configuration history application executable in the at least one computing device, the configuration history application configured to:
      monitor access interactions between a plurality of computing resources in the network-based computing environment;
      record information describing the access interactions;
      analyze the recorded information to identify an access interaction that changes a configuration to a first computing resource in a subscriber's account, wherein a second computing resource associated with the access interaction has a dependency relationship with the first computing resource;
      store, in a configuration history file, information corresponding to the first computing resource, wherein the information includes at least one record corresponding to a change in configuration state of the first computing resource at a particular point in time and relationship information that describes the dependency relationship; and
      identify, based on the change in configuration state of the first computing resource and the relationship information, a cause of a failure of the second computing resource.

2. The system of claim 1, wherein the configuration history application is further configured to display information of the record, wherein the displayed information is displayed in a format of a timeline.

3. The system of claim 2, wherein the timeline comprises a timeline block corresponding to each of the at least one record corresponding to a change in configuration state of the first computing resource at a particular point in time.

4. The system of claim 1, wherein the configuration history file includes a plurality of records, and wherein each record has information corresponding to a change in configuration state of the first computing resource at a particular point in time.

5. The system of claim 1, wherein the configuration history application is further configured to display information of the record, wherein the displayed information includes:
   a unique identifier for the first computing resource;
   a timeline having at least one timeline block configured to identify a date and time corresponding to when the change in configuration state of the first computing resource occurred;
   configuration information that describes a configuration state of the first computing resource at the identified date and time;
   relationship information that describes one or more dependency relationships between the first computing resource and other computing resources in the subscriber's account; and
   configuration change information.

6. The system of claim 1, wherein the at least one record corresponding to a change in configuration state of the first computing resource at a particular point in time includes metadata, attributes, relationships, current configuration information, and related events.

7. A method to monitor a configuration history of a plurality of computing resources existing in an account of a web service, the method comprising:
   recording information associated with interactions between the plurality of computing resources;
   filtering the recorded information to detect configuration changes to the plurality of computing resources including at least a configuration change to a first computing resource of the plurality of computing resources, wherein a second computing resource associated with the interactions has a dependency relationship with the first computing resource;
   generating, for each detected configuration change, a configuration item;
   storing, in a subscriber's store, each configuration item in a configuration history file, wherein at least one configuration history file further includes relationship information that describes the dependency relationship; and
   identifying, based on the configuration change to the first computing resource and the relationship information, a cause of a failure of the second computing resource.

8. The method of claim 7, further comprising displaying, to a display device, contents of the configuration history file.

9. The method of claim 8, wherein displaying, to a display device, the contents of the configuration history file includes displaying at least one configuration item associated with a particular one of the plurality of computing resources.

10. The method of claim 9, wherein the displayed contents of the at least one configuration item associated with a particular one of the plurality of computing resources is displayed in a format of a timeline.

11. The method of claim 7, wherein storing, in a subscriber's store, each configuration item in a configuration history file is performed on a periodic basis.

12. A non-transitory, computer-readable storage medium having stored thereon executable instructions that direct a computing device to perform the method of:
recording information associated with interactions between computing resources of a network-based computing environment;
analyzing the recorded information to identify changes to configuration states of a plurality of computing resources in a subscriber's account of the network-based computing environment;
recording configuration information for each of the identified changes to configuration states of the plurality of computing resources in the subscriber's account;
receiving and storing the recorded configuration information; and
identifying, based on an identified change to a configuration state of a first computing resource of the plurality of computing resources, a cause of a failure of a second computing resource associated with the interactions.

13. A non-transitory, computer-readable storage medium having stored thereon executable instructions that direct a computing device to perform the method of:
recording information associated with interactions between computing resources of a network-based computing environment;
analyzing the recorded information to identify changes to configuration states of a plurality of computing resources in a subscriber's account of the network-based computing environment including at least a configuration change to a first computing resource in the subscriber's account, wherein a second computing resource associated with the interactions has a dependency relationship with the first computing resource;
recording configuration information for each of the identified changes to configuration states of the plurality of computing resources in the subscriber's account;
receiving and storing the recorded configuration information and relationship information that describes the dependency relationship; and
identifying, based on the configuration change to the first computing resource and the relationship information, a cause of a failure of the second computing resource.

14. The non-transitory, computer-readable storage medium of claim 12, having stored thereon executable instructions that direct a computing device to further perform the method of retrieving the configuration information by invoking a system command that issues a description of configuration contents of a specified computing resource.

15. The non-transitory, computer-readable storage medium of claim 12, wherein the configuration information comprises at least one configuration item.

16. The non-transitory, computer-readable storage medium of claim 12, wherein the configuration information comprises metadata associated with the configuration information, attributes of the computing resources, relationships between the computing resources and other computing resources in the account, and a description of a current configuration of the computing resources in the subscriber's account.

17. The non-transitory, computer-readable storage medium of claim 12, having stored thereon executable instructions that direct a computing device to further perform the method of collecting a plurality of configuration items associated with each of the plurality of computing resources in the subscriber's account, wherein each of the plurality of configuration items associated with each of the plurality of computing resources includes configuration information associated with one of the plurality of computing resources at a particular point in time.

18. The non-transitory, computer-readable storage medium of claim 17, wherein the plurality of configuration items associated with each of the plurality of computing resources are organized according to a computing resource type.

19. The non-transitory, computer-readable storage medium of claim 17, having stored thereon executable instructions that direct a computing device to further perform the method of enabling graphical display of the configuration items.

20. The non-transitory, computer-readable storage medium of claim 19, wherein the graphical display of the configuration items is displayed in a timeline.

* * * * *